US008756008B2

(12) United States Patent
Funato

(10) Patent No.: US 8,756,008 B2
(45) Date of Patent: Jun. 17, 2014

(54) NAVIGATION APPARATUS

(75) Inventor: Yuji Funato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 764 days.

(21) Appl. No.: 12/356,861

(22) Filed: Jan. 21, 2009

(65) Prior Publication Data
US 2009/0216440 A1 Aug. 27, 2009

(30) Foreign Application Priority Data

Feb. 27, 2008 (JP) .................................. 2008-45801

(51) Int. Cl.
G01C 21/34 (2006.01)
G01C 21/12 (2006.01)

(52) U.S. Cl.
USPC ........................................................ 701/448

(58) Field of Classification Search
CPC ................................................... G01C 21/3602
USPC ..................... 701/200–217; 340/908; 704/448
See application file for complete search history.

(56) References Cited

U.S. PATENT DOCUMENTS 6,442,473 B1 * 8/2002 Berstis et al. ................. 701/117
6,658,352 B2 12/2003 Abe et al.
2001/0056326 A1 * 12/2001 Kimura ......................... 701/208
2003/0236622 A1 * 12/2003 Schofield ...................... 701/216
2005/0131638 A1 * 6/2005 Sencaj et al. .................. 701/209

FOREIGN PATENT DOCUMENTS

| JP | 2000-346666 | 12/2000 |
| JP | 2001-272237 | 10/2001 |
| JP | 2003-090731 | 3/2003 |
| JP | 2004-020345 | 1/2004 |
| JP | 2007-101379 | 4/2007 |
| JP | 2007-225497 | 9/2007 |

OTHER PUBLICATIONS

Japanese Office Action dated Oct. 9, 2012 for corresponding Japanese Patent Application No. 2008-045801 with translation.
Japanese Office Action dated Jun. 19, 2012 for corresponding Japanese Patent Application No. 2008-045801 with translation.

* cited by examiner

Primary Examiner — Minnah Seoh
(74) Attorney, Agent, or Firm — Brinks Gilson & Lione

(57) ABSTRACT

A navigation apparatus includes a satellite positioning section for calculating a present position, and a route setting section for searching for a route to a destination based on map data, and sets a detected route as a recommended route. A satellite positioning disable time guiding section sets as a focus point, a candidate point through which a vehicle first passes when traveling along the recommended route, and displays point guide information for guiding the focus point among candidate points as a route change point, when the satellite positioning section is incapable of calculating the present position.

18 Claims, 5 Drawing Sheets

NAVIGATION APPARATUS

PRIORITY CLAIM

This application claims the benefit of Japanese Patent Application No. 2008-5801, filed on Feb. 27, 2008, and which is incorporated by reference herein in its entirety.

BACKGROUND

1. Field of the Invention

The present invention relates to route guidance used when a satellite positioning function of a navigation system becomes disabled.

2. Description of the Related Art

Japanese Patent Application Publication No. 2007-101379 discloses a technology of route guidance when a satellite positioning function provided by a navigation apparatus becomes disabled. This publication discloses that when a satellite positioning function becomes disabled and a road section is previously defined, and when a guide point for guiding a route change is present within a road section, the guide point is brought forward a position before driving to the road section to guide the guide point.

Japanese Patent Application Publication No. 2007-101379 discloses that when a satellite positioning function becomes disabled, for proper guidance to be provided, a road section must be previously defined. Further, when the satellite positioning function becomes disabled at the outside of the road section, suitable route guidance cannot be provided.

SUMMARY

In view of the foregoing, an object of the present invention is to provide a navigation apparatus which quickly provides useful route guidance when a satellite positioning function becomes disabled, and which does not require the road section to be previously defined.

To accomplish the above-described objects, according to one aspect of the present invention, a navigation apparatus includes a satellite positioning section that performs satellite positioning based on radio waves received from a satellite. A satellite positioning section calculates a present position of the system or a vehicle carrying the system, based on signals received from a plurality of orbiting satellites. The navigation apparatus may include: a route setting section for searching for a route to a destination based on map data, which sets a detected route as a recommended route; and a satellite positioning disable time guiding section for setting as a focus point, a candidate point through which a vehicle first passes when traveling along the recommended route and displays point guide information for guiding the focus point among candidate points as a route change point on the recommended route, when the satellite positioning section is incapable calculating the present position.

When the satellite positioning function becomes disabled, guide information on the route change point on the recommended route to be arrived at next, is displayed. Therefore, useful route guidance can be provided when the satellite positioning function becomes disabled, even if the road section is not previously defined.

When a guide for a next point is requested from a user, the satellite positioning disable time guiding section may change a focus point to the candidate point through which a vehicle passes just after a present focus point when traveling along the recommended route, and may display point guide information for guiding the focus point after the change. Further, when a guide for a previous point is requested from the user, the satellite positioning disable time guiding section may change a focus point to the candidate point through which the vehicle passes just before a present focus point when traveling along the recommended route among the route change points on the recommended route, and may display point guide information for guiding the focus point after the change.

By such a configuration, if the satellite positioning function becomes disabled, upon request by the user, the user can be provided with the route change point and guide information on the subsequent route change points. For example, a user arriving at the route change point is guided through the guide information, and can receive guidance on the next route change point.

Further, the point guide information may include: a point guide map representing conditions of the focus point with a passing direction along the recommended route during passage of the focus point; information on a distance between a reference position and the focus point, setting as the reference position a present position calculated when the satellite positioning function becomes disabled; information representing characteristics of shapes of the road section between a reference position and the focus point, setting as the reference position a present position calculated when the satellite positioning function becomes disabled; information representing characteristics of a landscape, such as a landmark and facilities visible from the road section between a reference position and the focus point, setting as the reference position a present position calculated when the satellite positioning function becomes disabled; and information of at least any one of the number of intersections and traffic signals present between a reference position and the focus point, setting as the reference position a present position calculated when the satellite positioning function becomes disabled.

By such a configuration, the user can effectively arrive at the focus point without confusion and can be guided so as to correctly pass through the focus point in the direction along the recommended route.

Further, the above-described navigation apparatus may be configured such that a point on the recommended route at which a traffic signal is installed, an intersection on the recommended route at which a traffic signal is installed, and an intersection on the recommended route, are set as candidate points to select a focus point from among the candidate points in place of the route change point on the recommended route, and the point guide information is displayed.

In this case, when a point on the recommended route at which a traffic signal is installed is also set as one of the candidate points to select a focus point, the navigation apparatus may include a camera for photographing a front view in the direction in which the vehicle is traveling, and an image recognition section for recognizing a traffic signal taken out to an image photographed by the camera, in which the satellite positioning disable time guiding section may detect, based on recognition of the traffic signal by the image recognition section, an arrival at a position at which a traffic signal is installed, change, when detecting the arrival, a focus point to the candidate point through which the vehicle passes just after a present focus point when traveling along the recommended route, and display point guide information for guiding the focus point after the change.

Alternatively, the navigation apparatus may include a wireless communication device for communicating with a transmitting device disposed at the position at which the traffic signal is installed, in which the satellite positioning disable time guiding section may detect, based on the communication generated between the wireless communication device and the transmitting device, an arrival at the point at which the traffic signal is installed, change, when detecting the arrival, a focus point to the candidate point through which the vehicle passes just after a present focus point when traveling along the recommended route, and display point guide information for guiding the focus point after the change.

As described above, the navigation apparatus quickly provides useful route guidance when a satellite positioning function becomes disabled, where it is not required to previously define the road section at issue.

DETAILED DESCRIPTION

Figure 1:
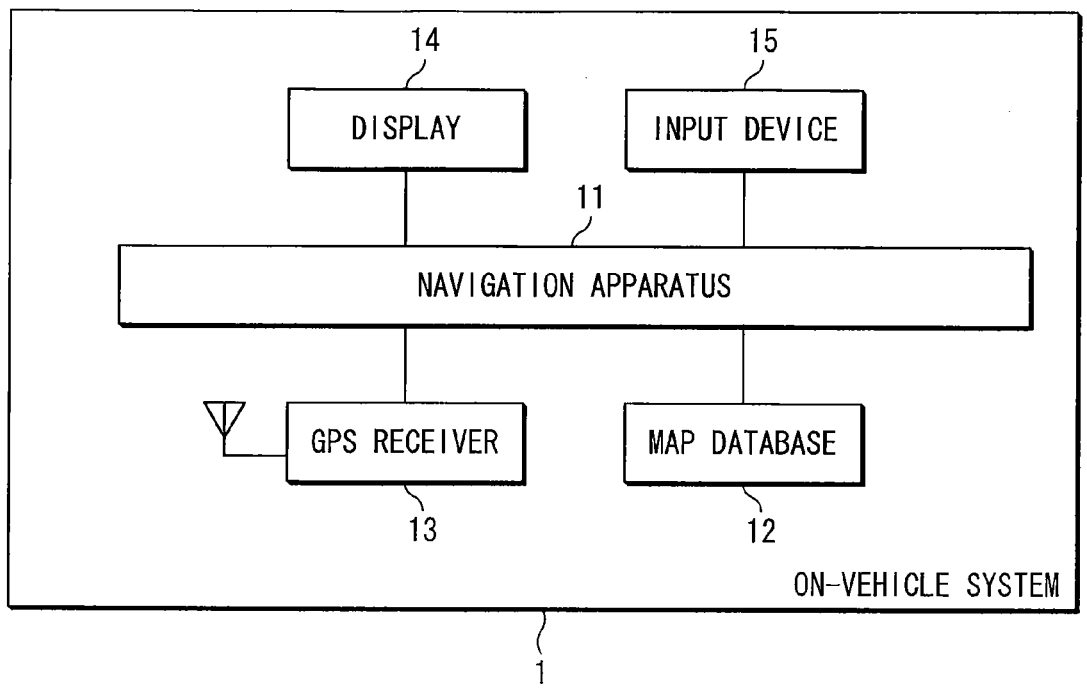
FIG. 1 is a block diagram illustrating an on-vehicle system according to an embodiment of the present invention.

As shown in FIG. 1, the on-vehicle system 1 comprises a navigation apparatus 11, a map database 12 for storing map data, a GPS receiver 13, a display device 14, and an input device 15. The navigation apparatus 11 may include a computer with a microprocessor, a memory, and other peripheral devices, such as a graphic processor or a geometric processor. When the microprocessor executes a software program, the navigation apparatus 11 performs each process shown in the various embodiments. In addition, the software program may be supplied to the navigation apparatus 11 via a storage medium or a communication network or link.

Figure 2:
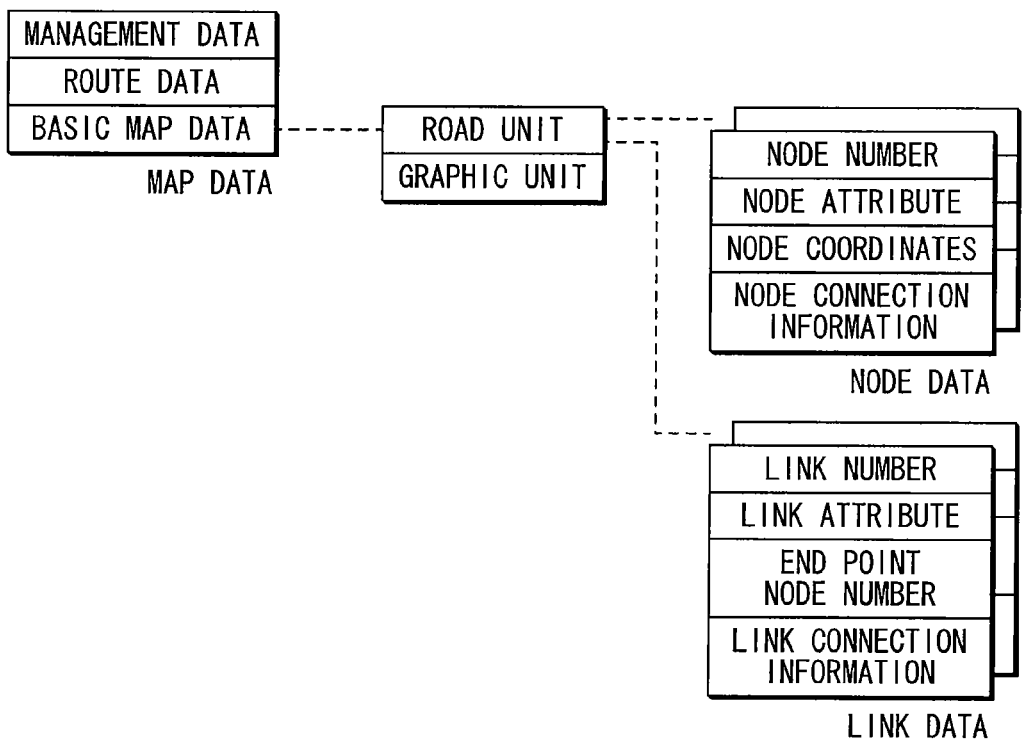
FIG. 2 is a diagram illustrating map data provided on the on-vehicle system according to an embodiment of the present invention.

FIG. 2 shows contents of map data stored in the map database 12. The map data may include management data describing versions of map data, route data registering various kinds of information, such as a route name of each route, and basic map data representing a map.

The basic map data includes road units representing a road network and graphic units representing graphic objects (place names or topographic elements) other than roads.

For each road unit, the road network may be defined as a node and a set of links connecting the nodes. Each road unit includes node data provided in each node and link data provided in each link. Each link is provided in an "up" direction and a "down" direction in the same road section.

Each node data includes a node number that identifies a corresponding node, a node attribute representing various attributes of the corresponding node, node coordinates indicating a position of the corresponding node, and node connection information. The node connection information corresponds to a link number of a link connected to one corresponding node, and a node number of another node connected to the one corresponding node via one link.

The node attribute indicates whether the node corresponds to an intersection or whether a traffic signal is installed at a point corresponding to the node. However, the node and link are set such that a point for installing the traffic signal necessarily acts as the node. Further, when the node corresponds to an intersection, in the node attribute, there are registered a name of the corresponding intersection, a landmark or structure of the intersection installed corresponding to each approach road to the intersection, and also a guide image corresponding to a view from a direction of the corresponding approach road.

Further, in each link data, there are registered a link number as an identifier of the corresponding link, a link attribute representing various attributes of the corresponding link, an end point node number representing node numbers of two nodes as end points of the corresponding link, and link connection information representing another link connected to each node as end points of one link.

In the link attribute, a level of gradient of the link, and a landmark viewed when traveling on the link are registered. In the above-described configuration, the navigation apparatus 11 receives the setting of destinations from a user via the input device 15, searches for a recommended route up to the destination received from a vehicle position/traveling direction, and performs the setting as the recommended route.

The navigation apparatus 11 is configured to calculate the vehicle position/traveling direction by performing map matching for a position of the vehicle using satellite positioning performed by the GPS receiver 13, or calculate a locus of the vehicle found by the vehicle position on the map data stored in the map database 12.

Then, the navigation apparatus 11 generates a guide image displayed on the map and indicates the calculated vehicle position/traveling direction, and displays it on the display device 14. When the recommended route is set, it is also displayed on the guide image. When the recommended route 301 is set and the vehicle position/traveling direction 302 is calculated by performing the map matching as shown in FIG. 3a, the navigation apparatus 11 displays on the display device 14 a vehicle mark 311 indicating the vehicle position/traveling direction 302 and a route graphic 312 indicating the recommended route 301, which are shown on the map in the vicinity of the vehicle position, as shown in FIG. 3b.

Figure 4:
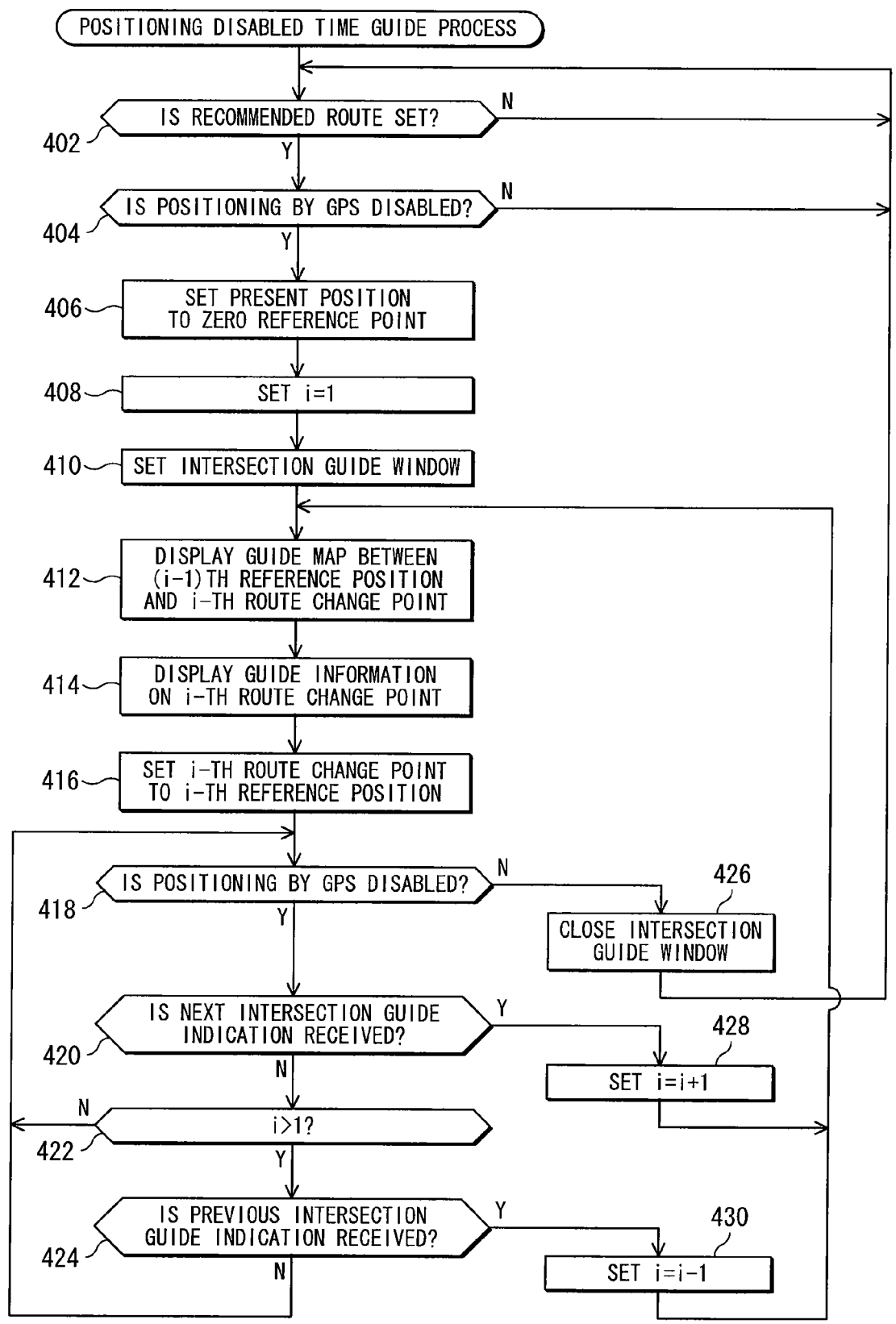
FIG. 4 is a flowchart illustrating a positioning disable time guide process according to an embodiment of the present invention.

The navigation apparatus 11 performs a positioning disable time guide process, as shown in FIG. 4. When the recommended route 301 is set (step 402), the navigation apparatus 11 may determine that the GPS receiver 13 is incapable of performing the satellite positioning (step 404). This may occur when the vehicle containing the GPS receiver 13 is traveling in a tunnel or under an overpass and is not able to receive the signal from the satellite, or is otherwise incapable of performing the satellite positioning.

When a satellite positioning function becomes disabled, the vehicle position calculated based on the position obtained by finally performing the satellite positioning just before the satellite positioning function became disabled, is first set to a zero reference position (step 406).

Next, the i=1 is set (step 408) and the intersection guide window is set on the display device 14 (step 410). Until the GPS receiver 13 returns to a state where the satellite positioning system is usable (step 418), the guide map between an $(i-1)^{th}$ reference position and an $i^{th}$ i-th route change point (step 412), and guide information on the $i^{th}$ route change point (step 414) are displayed on the intersection guide window, the $i^{th}$ route change point is set to the $i^{th}$ reference position (step 416). Here, the $i^{th}$ route change point means a point through which the vehicle passes as the $i^{th}$ point, after the passage through the zero reference position among intersections in which a course is changed to the right or left, when continuing to travel from the zero reference position along the recommended route 301.

Further, when an indication for guiding the next intersection is received from a user (step 420), the symbol i is increased by one (step 428). After the value of i is increased by one, after the guide map between the $(i-1)^{th}$ reference position and the $i^{th}$ route change point (step 412), and the guide information on the $i^{th}$ route change point (step 414) are displayed on the intersection guide window, the $i^{th}$ route change point is set to the $i^{th}$ reference position (step 416).

In the case of i>1 (step 422), when the previous intersection guide indication is received from the user (step 424), the symbol i is decreased by one (step 430). With regard to the symbol i after the decrease, after the guide map between the $(i-1)^{th}$ reference position and the $i^{th}$ route change point (step 412), and the guide information on the $i^{th}$ route change point (step 414) are displayed on the intersection guide window, the $i^{th}$ route change point is set to the $i^{th}$ reference position (step 416).

During the above-described process, if the GPS receiver 13 returns to a state where the satellite positioning system is usable (step 418), the intersection guide window is closed (step 426). The navigation apparatus 11 again continues to monitor whether the GPS receiver 13 is incapable of performing the satellite positioning when the recommended route 301 is set (steps 402 and 404).

As shown in FIG. 3b, the display device 14 displays the guide image, which indicates the vehicle position calculated based on the satellite positioning position at the time point along with the recommended route 301. Next, there is shown an example of the above-described positioning disable time guide process. In the case where the recommended route 301 is set as shown in FIG. 3a, when the satellite positioning function becomes disabled while the calculated vehicle position travels to the position 303 (steps 402 and 404), this point 303 is set to the zero reference position (step 406). Additionally, the intersection guide window as shown in FIG. 3c is set to the entire display screen (step 410).

As shown in FIG. 3a, a first right-turning and left-turning intersection 304 on the recommended route 301 after the passage through the zero reference position as the vehicle position 303 at the time when a satellite positioning function becomes disabled is calculated out as a first route change point. As shown in FIG. 3c, a guide map 320 is displayed on the intersection guide window (step 412), which shows a map in the range of area including the zero reference position and the first route change point, and a recommended route graphic 312 representing the recommended route 301. Here, a reference position mark 321 indicating the $i^{th}$ reference position (here, indicating the zero reference position) and a guide position mark 322 indicating a position just before the $i^{th}$ route change point (here, indicating the first route change point) on the recommended route 301, are set to be displayed on this guide map 320.

Figure 3C:
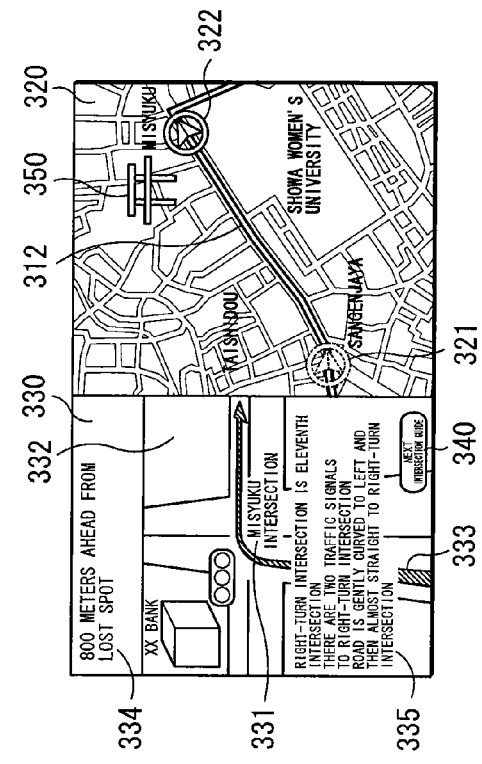
FIG. 3 is a diagram illustrating examples of display images of the on-vehicle system according to an embodiment of the present invention.

As shown in FIG. 3c, guide information 330 of the first route change point is displayed on the intersection guide window (step 414). The guide information 330 includes a name 331 of an intersection that is registered in a node attribute containing node data of the node. This represents the intersection corresponding to the route change point of the $i^{th}$ route change point (here, indicating the first route change point) included in the map data, a guide image 332 that guides a landmark and structure of the intersection in a shape viewed from a direction of an approach road to the intersection along the recommended route 301, and a graphic 333 indicating a passing direction along the recommended route 301 through the intersection.

The guide information 330 further includes a display 334 of a travel distance in the road section on the recommended route 301 from the $(i-1)^{th}$ reference position (here, indicating the zero reference position) to the $i^{th}$ route change point (here, indicating the first route change point) found based on the link data and node data of the link and node that form the road section from the $(i-1)^{th}$ reference position (here, indicating the zero reference position) to the $i^{th}$ route change point (here, indicating the first route change point), and a display 335 of characteristics (curvature and gradient of roads in the road section, and the number of traffic signals and intersections existing in the road section) on roads in the road section. In addition, the gradient of the road section can be found from a link attribute containing link data of a link that forms the road section.

Here, one button 340 for receiving the next intersection guide indication from the user and another button 341 for receiving the previous intersection guide indication from the user are provided on the intersection guide window. Note that when i=1, the button 341 for receiving the previous intersection guide indication from the user is not provided on the intersection guide window.

Further, when the next intersection guide indication is received from the user by the button 340, which guides the first route change point (step 420), the symbol i is increased to two (step 428). As shown in FIG. 3a, a second right- and left-turning intersection 305 on the recommended route 301 after the passage through the zero reference position as the vehicle position 303 at the time when a satellite positioning function becomes disabled, is calculated as a second route change point.

Figure 3D:
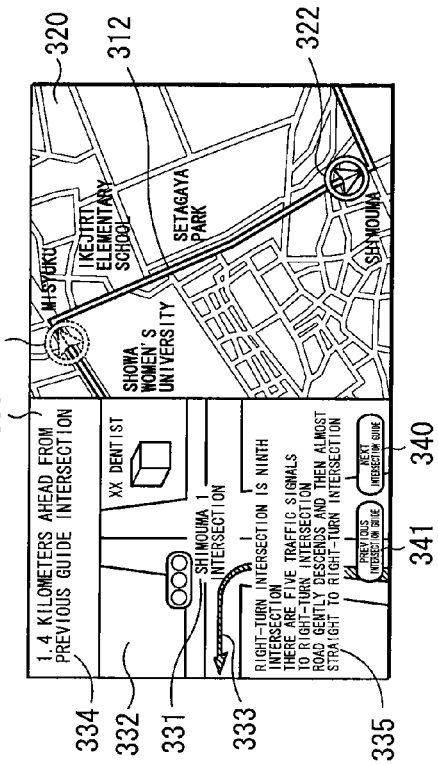
Figure 3A:
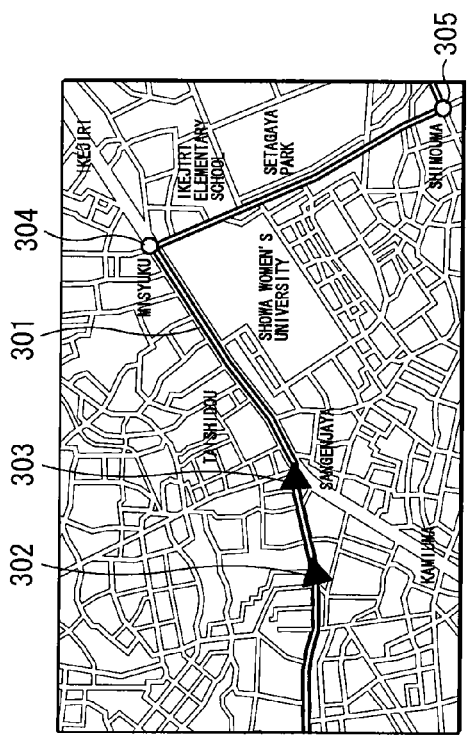
Figure 3B:
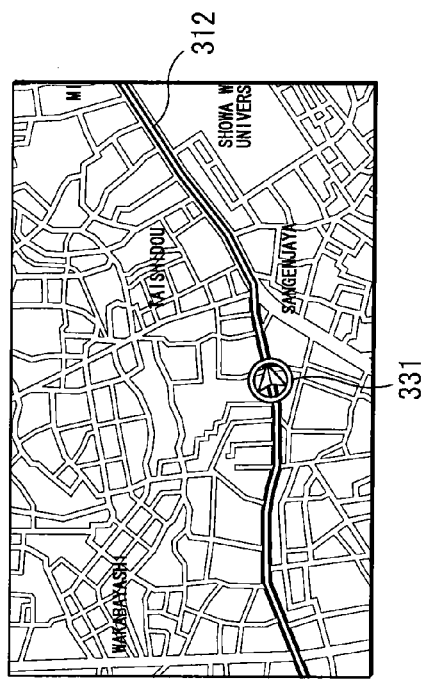

As shown in FIG. 3d, a display of the intersection guide window is updated to those of the guide map 320 between the first reference position and a second route change point, and the guide information 330 on the second route change point (steps 412 and 414).

As shown in FIG. 3d, the guide map 320 of the intersection guide window at the time i=2 shows a map in the range of area including the first reference position as the first route change point and the second route change point along with the recommended route graphic 312 representing the recommended route 301, the reference position mark 321 indicating the first reference position as the first route change point, and the guide position mark 322 indicating a position just before the second route change point on the recommended route 301.

Further, the guide information 330 of the intersection guide window at the time i=2 includes a name 331 of an intersection corresponding to the second route change point, a guide image 332 that guides a landmark and structure of the intersection in a shape viewed from a direction of an approach road to the intersection along the recommended route 301, a graphic 333 indicating a passing direction along the recommended route 301 through the intersection, a display 334 of a travel distance in the road section from the first reference position as the first route change point to the second route change point, and a display 335 of characteristics (curvature and gradient of roads in the road section, and the number of traffic signals and intersections existing in the road section) on roads in the road section.

Next, when the next intersection guide indication is received from the user by the button 340 at the time i=2 shown in FIG. 3d (step 420), the symbol i is increased to three. The display of the intersection guide window is updated to those of the guide map 320 between the second and third route change points, the guide map 320 that guides the third route change point as the next route change point, and the guide information 330 (steps 428, 412 and 414).

Whenever the next intersection guide indication is received from the user by the button 340, the symbol i is increased by one. The display of the intersection guide window is updated to those of the guide map 320 between the route change point, and the guide information 330 on the next route change point (steps 428, 412 and 414).

On the other hand, as shown in FIG. 3d, when the previous intersection guide indication is received from the user by the button 341 at the time of i>1 (step 424), the symbol i is decreased by one. The display of the intersection guide window is updated to those of the guide map 320 between the route change point that is guided by the intersection guide window at the time point and the previous route change point, and the guide information 330 on the previous route change point (steps 430, 412 and 414).

That is, when the previous intersection guide indication is received from the user by the button 341, for example, at the time i=2 shown in FIG. 3d (step 424), the symbol i is returned to one. The display of the intersection guide window is returned to that of FIG. 3c (steps 430, 412 and 414).

In the above-described embodiment shown in FIG. 3c, a graphic 350 that represents a landmark viewed when driving on a section between the $(i-1)^{th}$ reference position and the $i^{th}$ route change point along the recommended route 301 on the guide map 320 at the time of i=n. This landmark may be the landmark that is registered in the link attribute containing the link data of the link that forms the section between the $(i-1)^{th}$ reference position and the $i^{th}$ route change point along the recommended route 301.

Further, in the above-described embodiment, when the satellite positioning function becomes disabled, the route change point at which the course is changed to the right or left is guided in the future by the intersection guide window. Further, when the satellite positioning function becomes disabled, each intersection through which the vehicle passes may be guided by the intersection guide window, or the traffic signal-installed point through which the vehicle passes. A point for the traffic signal can be found as a node of the node data in which a point for installing the traffic signal is registered in the node attribute. Further, the intersection can be found as a node of the node data in which an effect of the intersection is registered in the node attribute.

For example, when the satellite positioning function becomes disabled, each intersection at which a traffic signal is installed and through which the vehicle passes is guided in the future by the intersection guide window. In this case, the $i^{th}$ route change point may be replaced by the $i^{th}$ traffic signal-installed intersection to perform the positioning disable time guide process shown in FIG. 4.

Figure 5A:
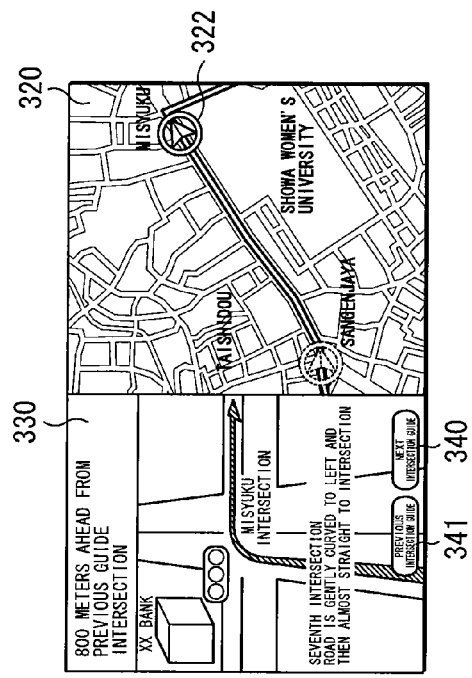
FIG. 5 is a diagram illustrating display images of the on-vehicle system according to an embodiment of the present invention.

The positioning disable time guide process is performed as follows. When the recommended route 301 is set as shown in FIG. 5a and the satellite positioning function becomes disabled while the calculated vehicle position travels to the position 303, this position 303 is set to the zero reference position. Then, an intersection 511 on the recommended route 301 at which a first traffic signal is installed after the passage through the zero reference position as the vehicle position 303 is calculated as a first traffic signal-installed intersection.

Figure 5B:
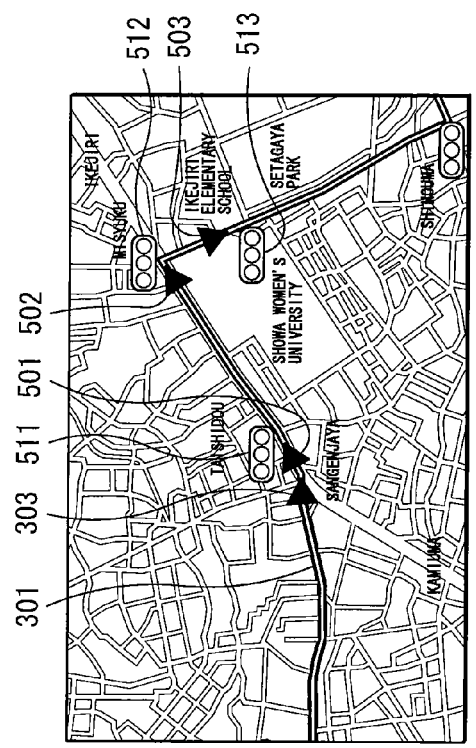

As shown in FIG. 5b, the guide map 320 between the zero reference position and the first traffic signal-installed intersection 511, and the guide information 330 on the first traffic signal-installed intersection 511, are displayed on the intersection guide window. Further, the first traffic signal-installed intersection 511 is set to the first reference position.

In this state, when the next intersection guide indication is received from the user by the button 340, as shown in FIG. 5a, an intersection 512 on the recommended route 301 at which a second traffic signal is installed after the passage through the zero reference position as the vehicle position 303 at the time where the satellite positioning function becomes disabled, is calculated as a second traffic signal-installed intersection.

Figure 5C:
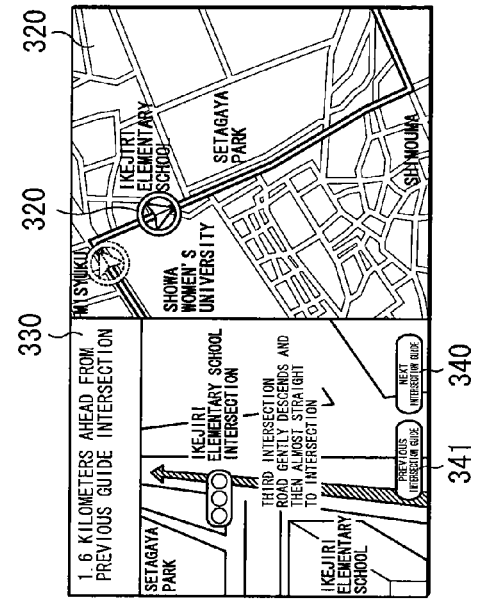

As shown in FIG. 5c, the display of the intersection guide window is updated to those of the guide map 320 between the first reference position 511 as the first traffic signal-installed intersection and the second traffic signal-installed intersection 512, and the guide information 330 on the second traffic signal-installed intersection 512. Then, the second traffic signal-installed intersection 512 is set to the second reference position.

In this state, when the next intersection guide indication is further received from the user by the button 340, as shown in FIG. 5a, an intersection 513 on the recommended route 301 at which a third traffic signal is installed after the passage through the zero reference position as the vehicle position 303 at the time where the satellite positioning function becomes disabled, is calculated as a third traffic signal-installed intersection.

Figure 5D:
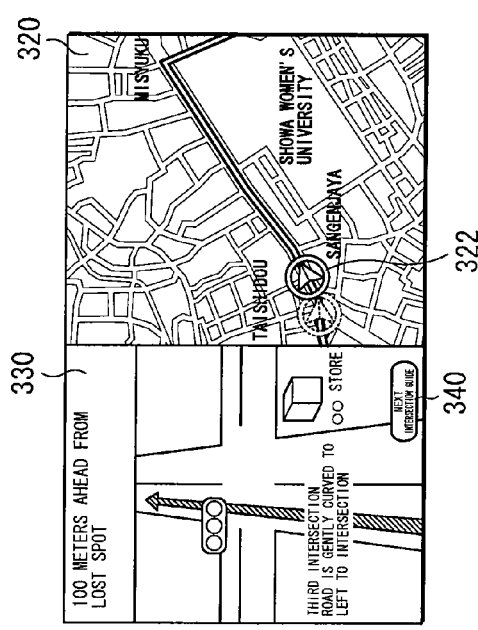

As shown in FIG. 5d, the display of the intersection guide window is updated to those of the guide map 320 between the second reference position 512 as the second traffic signal-installed intersection and the third traffic signal-installed intersection 513, and the guide information 330 on the third traffic signal-installed intersection 513. Then, the third traffic signal-installed intersection 513 is set to the third reference position.

In addition, positions 501, 502 and 503 shown in FIG. 5a indicate those corresponding to the guide position marks 322 shown in FIGS. 5b, 5c and 5d. When the previous intersection guide indication is received from the user by the button 341 as shown in FIGS. 5b, 5c, and 5d, the display of the intersection guide window is updated to those of the guide map 320 of the traffic signal-installed intersection prior to the traffic signal-installed intersection guided by the intersection guide window in the time point and the guide information 330 on the previous traffic signal-installed intersection.

Here, the buttons 340 and 341 for receiving the next intersection guide indication and the previous intersection guide indication from the intersection guide window are eliminated in the positioning disable time guide process for guiding the above-described traffic signal-installed intersection. At the same time, the passage through the traffic signal-installed intersection is detected by the navigation apparatus 11. The detection of the passage through the traffic signal-installed intersection may be considered as generation of the next intersection guide indication in step 420.

Figure 6A:
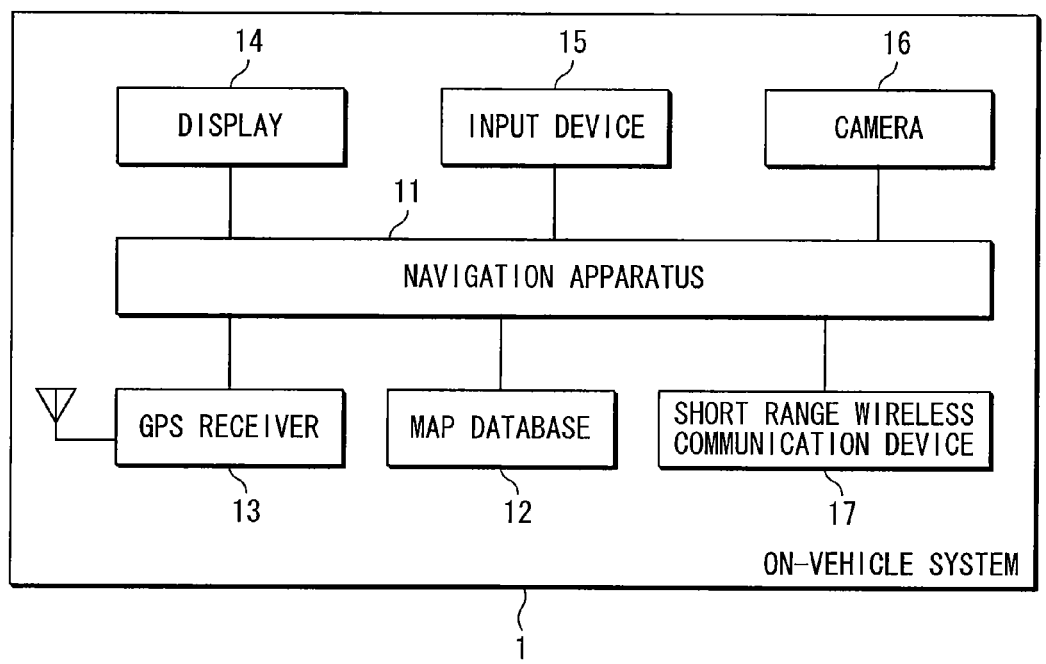
FIG. 6 is a block diagram illustrating another configuration of the on-vehicle system according to the embodiment of the present invention.
Figure 6B:
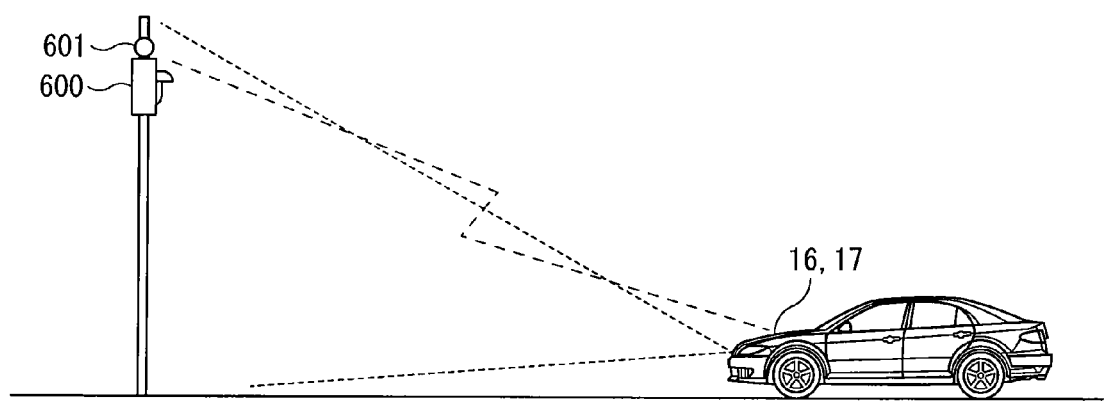

Here, the passage through the traffic signal-installed intersection is detected as follows by the navigation apparatus 11. For example, a camera 16 for photographing the front of the vehicle is provided on the on-vehicle system 1 as shown in FIGS. 6a and 6b, and further, a traffic signal 600 included in images photographed by the camera 16 is recognized by the image recognition process by the navigation apparatus 11. Alternatively, for example, as shown in FIGS. 6a and 6b, a short range wireless communication device 17 that communicates with a transmitting device 601 that is provided on the traffic signal and that transmits traffic information is provided on the on-vehicle system 1. Then, the passage through the traffic signal-installed intersection is detected by the navigation apparatus 11 based on the communication between the short range wireless communication device 17 and the transmitting device 601.

When the guided traffic signal-installed intersection on the recommended route 301 is passed, the next traffic signal-installed intersection can be automatically guided. The components and systems of the on-vehicle system 1 shown in the above-described embodiments can be applied similarly to a portable navigation apparatus.

According to the present embodiment, when the satellite positioning function becomes disabled, the route change point, intersection, traffic signal-installed point, and traffic signal-installed intersection on the recommended route 301 to be arrived at next, are set as a guide target point. When the satellite positioning function becomes disabled, the guide target point on the recommended route 301 to be arrived at next is guided. Therefore, even if the road section in which the satellite positioning function becomes disabled is not previously defined, useful route guidance can be provided.

Further, not only is guidance provided for the guide object point just after a point at which the satellite positioning function becomes disabled, but guidance is also provided for the subsequent guide object point according to the request of the user. Accordingly, the user, for example, when arriving at the guided point, can receive the guidance of the next point.

Although only a few exemplary embodiments have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. A navigation apparatus having a satellite positioning section for calculating a present position, the apparatus comprising:
    a route setting section for searching for a route to a destination based on map data and setting a detected route as a recommended route; and
    a GPS-disabled guiding section configured to provide alternate guidance to a user while the satellite positioning section is incapable of calculating a present position, the GPS-disabled guiding section configured to:
        set as a focus point, a candidate point through which a vehicle first passes when traveling along the recommended route;
        display point guide information for guiding the focus point among one or more candidate points as a route change point, wherein the point guide information includes information representing characteristics of shapes of the road section or characteristics of a landscape visible from the road section, between a reference position and the focus point;
        wherein the location corresponding to the characteristic of shape of the road section or the visible landscape is set as the reference position by manual operation of the user when the user recognizes the characteristic of shape or the visible landscape.

2. The navigation apparatus according to claim 1, wherein when a guide for a next point is requested from the user, the GPS-disabled guiding section changes a focus point to the candidate point through which the vehicle passes just after a present focus point when traveling along the recommended route, and displays point guide information for guiding the focus point after the change.

3. The navigation apparatus according to claim 2, wherein when a guide for a previous point is requested from the user, the GPS-disabled guiding section changes a focus point to the candidate point through which the vehicle passes just before a present focus point when traveling along the recommended route, and displays point guide information for guiding the focus point after the change.

4. The navigation apparatus according to claim 1, wherein the point guide information includes a point guide map representing conditions of the focus point with a passing direction along the recommended route during passage of the focus point.

5. The navigation apparatus according to claim 1, wherein the point guide information includes information on a distance between a reference position and the focus point, setting as the reference position a present position calculated when the satellite positioning function becomes disabled.

6. The navigation apparatus according to claim 1, wherein the point guide information includes information representing characteristics of shapes of the road section between a reference position and the focus point, setting as the reference position a present position calculated when the satellite positioning function becomes disabled.

7. The navigation apparatus according to claim 1, wherein the point guide information includes information representing characteristics of a landscape visible from the road section between a reference position and the focus point, setting as the reference position a present position calculated when the satellite positioning function becomes disabled.

8. The navigation apparatus according to claim 1, wherein the point guide information includes information of at least any one of a plurality of intersections and traffic signals present between a reference position and the focus point, setting as the reference position a present position calculated when the satellite positioning function becomes disabled.

9. A navigation apparatus having a satellite positioning section that performs satellite positioning for calculating a present position, the apparatus comprising:
    a route setting section for searching for a route to a destination based on map data and setting a detected route as a recommended route; and
    a GPS-disabled guiding section configured to provide alternate guidance to a user while the satellite positioning section is incapable of calculating a present position, the GPS-disabled guiding section configured to:
        set as a focus point, a candidate point through which a vehicle first passes when traveling along the recommended route;
        display point guide information for guiding the focus point among candidate points as a point on the recommended route at which a traffic signal is detected or an intersection on the recommended route at which a traffic signal is detected;
        wherein the location corresponding traffic signal is set as the reference position by manual operation of the user when the user recognizes the traffic signal or by automatic operation when the traffic signal is detected.

10. The navigation apparatus according to claim 9, wherein when a guide for a next point is requested from a user, the GPS-disabled guiding section changes a focus point to the candidate point through which the vehicle passes just after a present focus point when traveling along the recommended route, and displays point guide information for guiding the focus point after the change.

11. The navigation apparatus according to claim 10, wherein when a guide for a previous point is requested from a user, the GPS-disabled guiding section changes a focus point to the candidate point through which the vehicle passes just before a present focus point when traveling along the recommended route and displays point guide information for guiding the focus point after the change.

12. The navigation apparatus according to claim 9, wherein the point guide information includes a point guide map representing conditions of the focus point with a passing direction along the recommended route during passage of the focus point.

13. The navigation apparatus according to claim 9, wherein the point guide information includes information on a distance between a reference position and the focus point, setting as the reference position a present position calculated when the satellite positioning function becomes disabled.

14. The navigation apparatus according to claim 9, wherein the point guide information includes information representing characteristics of shapes of the road section between a reference position and the focus point, setting as the reference position a present position calculated when the satellite positioning function becomes disabled.

15. The navigation apparatus according to claim 9, wherein the point guide information includes information representing characteristics of a landscape visible from the road section between a reference position and the focus point, setting as the reference position a present position calculated when the satellite positioning function becomes disabled.

16. The navigation apparatus according to claim 9, wherein the point guide information includes information on the number of intersections present between a reference position and the focus point, setting as the reference position a present position calculated when the satellite positioning function becomes disabled.

17. The navigation apparatus according to claim 9, further comprising:
a camera for photographing a front view of a traveling direction of a vehicle; and
an image recognition section for recognizing a traffic signal taken out to an image photographed by the camera, wherein:
when the satellite positioning function becomes disabled, the satellite positioning section sets as the candidate point a point on the recommended route at which a traffic signal is installed; and
the GPS-disabled guiding section detects, based on recognition of the traffic signal by the image recognition section, an arrival at the point at which the traffic signal is installed, changes, when detecting the arrival, a focus point to the candidate point through which the vehicle passes just after a present focus point when traveling along the recommended route, and displays point guide information for guiding the focus point after the change.

18. The navigation apparatus according to claim 9, further comprising:
a wireless communication device for communicating with a transmitting device located proximate the installed traffic signal, wherein:
when the satellite positioning function becomes disabled, the satellite positioning section sets as the candidate point a point on the recommended route at which the traffic signal is installed; and
the GPS-disabled guiding section detects, based on the communication generated between the wireless communication device and the transmitting device, an arrival at the point at which the traffic signal is installed, changes, when detecting the arrival, a focus point to the candidate point through which the vehicle passes just after a present focus point when traveling along the recommended route, and displays point guide information for guiding the focus point after the change.

* * * * *